United States Patent [19]
Bergler et al.

[11] Patent Number: 5,481,598
[45] Date of Patent: Jan. 2, 1996

[54] SUBSCRIBER TERMINAL FOR ISDN NETWORKS

[75] Inventors: Frank Bergler, Niefern; Adrian Mauch, Stuttgart; Holger Hellenschmidt, Rudersberg, all of Germany

[73] Assignee: Alcatel N.V., Netherlands

[21] Appl. No.: 955,519

[22] Filed: Oct. 2, 1992

[30] Foreign Application Priority Data

Oct. 3, 1991 [DE] Germany ............................ 41 32 872.8
Aug. 29, 1992 [DE] Germany ............................ 42 28 801.0

[51] Int. Cl.$^6$ ................................................ H04M 11/00
[52] U.S. Cl. ............................ 379/94; 379/96; 379/100
[58] Field of Search ................................ 379/100, 94, 96, 379/97, 98, 93; 358/442, 443, 401

[56] References Cited

U.S. PATENT DOCUMENTS

| | | |
|---|---|---|
| 4,330,886 | 5/1982 | Fukuda et al. |
| 5,036,513 | 7/1991 | Greenblatt . |
| 5,041,918 | 8/1991 | Ishida et al. ............................ 379/100 |
| 5,065,425 | 11/1991 | Lecomte et al. ......................... 379/96 |
| 5,113,396 | 5/1992 | Kagami ................................. 379/93 |
| 5,317,630 | 5/1994 | Feinberg et al. ......................... 379/96 |

FOREIGN PATENT DOCUMENTS 0349346  1/1990  European Pat. Off. .
2189968  11/1987  United Kingdom .

OTHER PUBLICATIONS

"A Study of Audio Communication Devices for ISDN", Tasuhiro Naganawa, et al, IEEE Transactions on Consumer Electronics, vol. 36, No. 3, Aug. 1990, pp. 753–757.
"The digital Terminal Adapters SOPHO–LAM S375/P375 and TA 375.", B. Besselsen, et al, Philips Telecommunication Review, vol. 48, No. 4, Dec. 1990, pp. 28–35.
"Hayes Standard AT Command Set Enhanced for ISDN", Hayes Microcomputer Products, Inc., Release A, Nov. 30, 1989.
"Asynchronous Facsimile CDE Control Standard", Telecommunications Industry Association, Standards Proposal No. 2388–13, dated Mar. 13, 1992.

*Primary Examiner*—Curtis Kuntz
*Assistant Examiner*—Stella L. Woo
*Attorney, Agent, or Firm*—Ware, Fressola, Van Der Sluys & Adolphson

[57] ABSTRACT

A subscriber terminal for ISDN networks in the form of an ISDN telephone (11) is equipped with a keyboard (15,16), a display (14) and a connection socket (19) for another applications terminal (21–24), such as a printer and/or a keyboard and/or a computer, a PC for example. An interface is integrated into the ISDN telephone (11) for the cost-effective connection of an applications terminal, with which the ability to communicate between the applications terminal to be connected (21–24) and the ISDN network, can be established.

25 Claims, 2 Drawing Sheets

SUBSCRIBER TERMINAL FOR ISDN NETWORKS

TECHNICAL FIELD

The present invention relates to a subscriber terminal for ISDN networks in the form of an ISDN telephone.

BACKGROUND OF THE INVENTION

In known subscriber terminals for ISDN networks, the applications terminal that is connected through the socket connection, for example in the form of a PC, must be hardware- and software-adapted for this possibility of application. To that effect, such a PC must be equipped with an ISDN adapter card as well as a program diskette. Such an ISDN adapter card is relatively expensive. Until now, for example, only slow transmission was possible with the aid of "rate adaptation" e.g., when a PC was connected through a so-called external V24 interface. In addition, the PC control program stored on the diskette to enable the PC to communicate with the ISDN network, for example, was relatively costly and complicated. Furthermore, when using the subscriber terminal for different services such as telefax and telex, it is important that the respective applications terminal is always ready to operate, which can only be ensured when the respective applications terminal is permanently on line, i.e. day and night.

DISCLOSURE OF INVENTION

The task of this invention is therefore to create a subscriber terminal for ISDN networks in the form of an ISDN telephone of the type described earlier, which can provide the services that are possible with the ISDN network through more cost-effective connections of applications terminals.

According to the present invention, the ISDN telephone contains an interface with which communication can be established between the applications terminal to be connected, and the ISDN network.

The measures of the invention permit the omission of a special communication component, such as the ISDN adapter card used heretofore, since the ISDN telephone already contains the functions for the PC in the ISDN network, for example. The control program, which until now had to be installed in the PC, is now installed in the ISDN telephone in the form of the cited interface, i.e. in a place between the applications program in the applications terminal, and the communications software in the ISDN telephone. Integration of this interface into the ISDN telephone makes it possible to connect the applications terminal directly to the ISDN telephone, thereby enabling it to communicate without additional hardware and/or software, such as a communications component, remote data control and similar.

It is now possible, according to the invention, to expand the integrated interface of the ISDN telephone for different functions of different configuration examples.

For example, if a non-voice server, such as a Telematic server, is incorporated in the interface, according to a first configuration example of this invention, a relatively simple interface is provided, with which a printer and/or a keyboard can be connected to the ISDN telephone. This means that text can be received by the ISDN telephone or the ISDN network and printed out by the printer, and text can be transmitted from the keyboard as well. This creates a very cost-effective applications or telex terminal, which can either be used only as a receiving terminal, or a simple transmitting and receiving terminal.

It is useful to provide the ISDN telephone with an intermediate memory that is in a position, with a properly expanded memory, to store the incoming or received text information, which can then be printed out by the printer. This means that the printer need not be constantly on line, which the telephone is always anyway.

If a non-voice server and an intermediate memory are used, a "store-and-forward" operation may be provided, according to the invention, for quick monitoring by the ISDN network and for slower communication between telephone and PC, for example.

According to a further variation of the first configuration example of this invention, the keyboard and display of the ISDN telephone are used as a sender terminal, and it is thus also possible to use the ISDN telephone keyboard directly for the transmission of text information, so that an external keyboard can be omitted. The same applies to the ISDN telephone display, which can be used for checking text to be transmitted, but also to make received text communications visible, in addition to the printer.

According to another configuration example of this invention, the non-voice server is addressed by the service-independent interface area, for example by the APPLI/COM Protocol. It involves transmitting the envelope data for communication control and the document data from the respective PC/host to the telephone, and vice versa. This means that both the transmitting and receiving intermediate memory can be directly accessed from this interface area, and that these memory sections can be organized. In addition, this establishes the compatibility of the task description and the document form between the communications software and the applications program, so that communication from applications terminal to applications terminal is possible, without requiring the operator to prepare or handle the information. The intermediate memory may have a sending and a receiving area which are organized by the non-voice server.

A further and therefore third configuration example of the present invention is provided wherein the interface contains a control device, with which the telephone function can be remote controlled, and information can be transmitted directly to the ISDN network. It makes it possible to control and organize the applications terminal (computer, PC, work station) with respect to the ISDN network, so that direct communication, i.e. without intermediate memory, is possible during dialog operation.

According further to the present invention, it is especially advantageous to equip the control device with a Hayes Standard AT Command Set for an ISDN compatible Command Set, and an expanded Command Set for telefax service.

Such an expanded Command Set can be based to advantage on the TIA/EIA-592 of the Telecommunications Industry Association. In addition, according to the invention, the transmission of a pure binary file, instead of image coding, is possible for telefax service.

In further accord with the present invention, it is possible to select the operation of individual configuration examples, such as non-voice server, the service-independent interface area or the control device with a fully expanded ISDN telephone.

In still further accord with the present invention, the hardware and software of the interface are installed in the ISDN telephone, although it is also possible to add a supplementary housing to the actual telephone housing. However, according to the above, it is essential for the interface to be associated with or assigned to the ISDN telephone as such.

Furthermore, according to the present invention, the display of the communications terminal, which is available anyway, can be used to display the status.

Further details of the invention can be found in the following description, which describes and explains the invention in more detail, by means of the configuration example in the drawing.

BEST MODE FOR CARRYING OUT THE INVENTION

Figure 1:
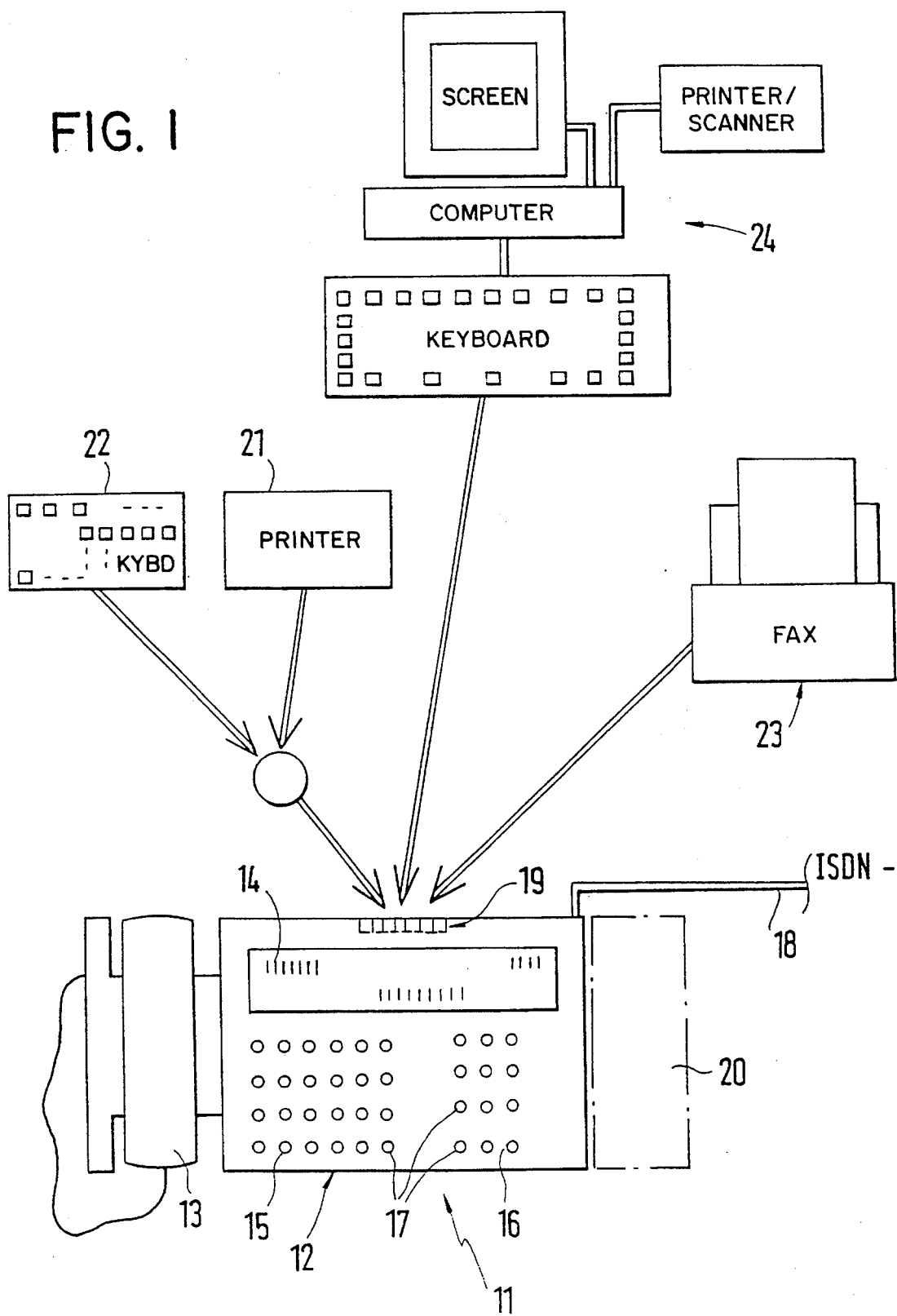
FIG. 1 is a schematic representation of applications for a subscriber terminal for ISDN networks in the form of an ISDN telephone in accordance with the present invention.

FIG. 1 represents a subscriber terminal in the form of an ISDN telephone 11, which is suitable for connection to the ISDN network. This ISDN telephone 11 has a housing 12 with a telephone receiver 13 placed sideways for example, with an alphanumeric display 14 and two groups 15 and 16 of alphanumeric and symbol keys 17. The ISDN telephone 16 is furthermore equipped with a connecting cable 18 for connection to the ISDN network, and in addition with at least one connection socket 19 for external applications terminals, which will be described later on.

The ISDN telephone 11 is so equipped, that one or more applications terminals, such as a printer 21 or an external keyboard 22, or a facsimile device 23, or a text processing system, for example an office PC 24, a work station or similar, are able to communicate through it, without the need to equip the respective applications terminal(s) with special communication components (hardware and software) and remote data controls. According to the configuration example in the drawing, the PC 24 contains an input keyboard and a screen, in addition to an operating station, as well as a printer and a scanner, so that it can be used with telephone 11 for both text-oriented services (teletex, telex), and graphics-oriented services (telefax) through the ISDN network.

Figure 2:
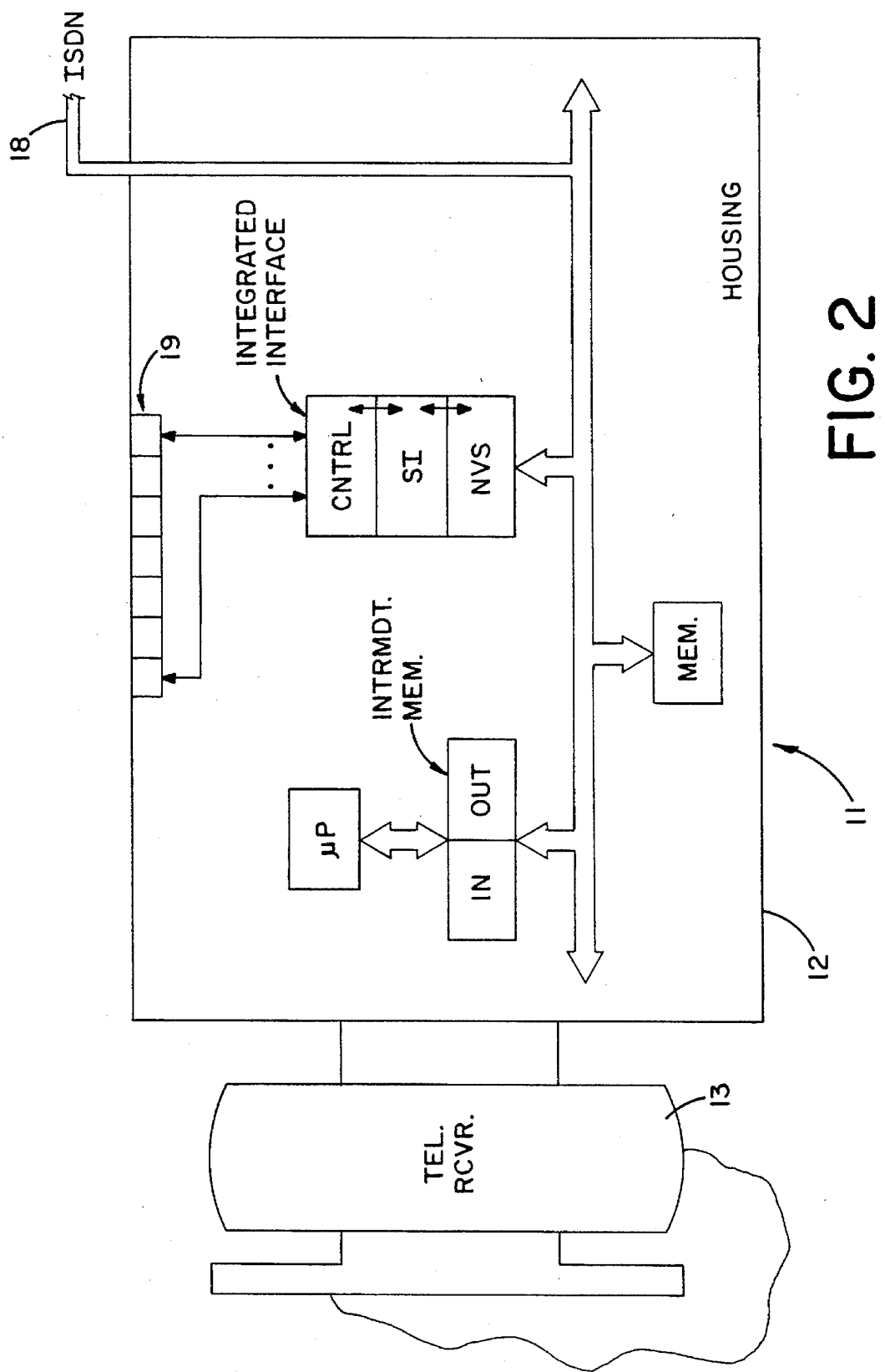
FIG. 2 shows the housing of FIG. 1 in more detail.

To that effect, an interface (hardware and software) has been integrated into the ISDN telephone 11, with which the ability to communicate can be established between the applications terminal 21, 22 or 24 to be connected, and the ISDN network. As shown in the drawing, the interface is either built into the housing 12, as shown in FIG. 2 or as shown by the broken lines, it is located in a supplementary housing, which is removable. The applications terminal to be connected is not a communications terminal by itself; it requires the interface that is integrated into the ISDN telephone, and its assignment. The integrated interface, between the applications part in the respective applications terminal and the communications part in the ISDN telephone 11, has a so-called non-voice server representing a program part, which is located (in accordance with the OSI reference model) above layer 3, i.e. in layers 4 to 7, in which the D and B channel of the ISDN network is normally organized and functions. This program part, or this non-voice server, which functions under a simple interface specification in layer 7, is so constructed, that if, as is the case in the first configuration example, a printer 21 and/or a keyboard 22 is connected to the connector socket 19 of the ISDN telephone 11, it, or this terminal, is able to communicate with the ISDN network through the ISDN telephone 11. In addition, an intermediate memory may be integrated into the ISDN telephone 11 (as part of the communications part), which is large enough so that incoming and outgoing messages can be stored in ISDN telephone 11. For example, incoming messages are stored until they are requested by means of the printer 21. The outgoing messages are stored in a buffer, for the purpose of transmitting the messages from the intermediate storage over the ISDN network, in other words not immediately (store-and-forward operation). The printer 21 and the keyboard 22 used in this way thus constitute one example of a simple and cost-effective applications terminals.

Instead of using the external keyboard 22, for another example, it is also possible with this first configuration example to enter the outgoing message by means of one or both groups 15, 16 through keyboard 17, and make the input visible on the display 14. Other examples according to these teachings will be evident.

In accordance with a further (second) configuration example, the interface, which is equipped with the non-voice server in the ISDN telephone 11, is expanded by a service-independent interface area, in such a way, that a determined interface specification is provided in layer 7 of the control-communications part of the ISDN telephone. This interface specification, for example, is the telecommunications interface APPLI/COM, as standardized by a joint action of the German Federal Post Office TELEKOM, the Labor Syndicate's Communications Office, and some manufacturers of telecommunications installations (see APPLI/COM brochure "The Standardized Telecommunications Interface", version 10, July 1990 status; Publisher: German Federal Post Office TELEKOM, Central Telecommunications Office, Darmstadt). This APPLI/COM interface is settled between the applications part and the communications part, and makes it possible for different services such as teletex and telex, as page-oriented communications services, as well as telefax, as a graphics-oriented communications service, to communicate with the ISDN network. This APPLI/COM interface specification makes the organization and control of the intermediate memory possible, which has a separate transmitting and receiving memory area in the ISDN telephone 11. This makes it possible to connect nearly any computer, such as PC's, work stations and such, directly to the ISDN telephone 11, without the need of an ISDN adapter card for the PC, for example; however, it is stipulated that the PC is able to produce the documents by means of any editor, and transmit them by means of any communications program (e.g. PROCOMM, ASYCOR) between the PC and the ISDN telephone.

In text-oriented services, such as teletex and telex, it is no problem to locate the intermediate memory in the ISDN telephone housing 12, since it requires a comparably small memory, which enables the PC to be turned off during night operation, for example, so that incoming messages can be stored in the ISDN telephone 11, which is always on line. If a telefax function is to be added to the ISDN telephone 11, the size of the graphics-oriented memory requires it to be located in the above named supplemental housing 20. In both cases, receiving as well as sending by the PC 24 of both teletex or telex and telefax service takes place through the intermediate memory in the ISDN telephone 11.

In accordance with a further (third) configuration example, the service-independent interface area equipped with the APPLI/COM interface specification is replaced by an interface into which a control program part is integrated, with which the respective telephone functions are remote controlled, and with which messages can be directly sent to the ISDN network, in other words sidestepping the above named intermediate memory.

For example, the so-called AT-Command-Set-Program is used as such a control program part, as described in the publication "Hayes Standard AT Command Set, Enhanced for ISDN, Release A, November 30, 1989, by Hayes Microcomputer Products, Inc., Atlanta, USA". This control device, which is integrated into the interface, makes a direct intervention into the ISDN network possible through the ISDN telephone 11. It permits the ISDN line to be immediately established, without the need for an intermediate memory. Instead, the ISDN telephone 11 is integrated into a modem, which understands the control program in the form of the AT-Command-Set for example, and not only makes the corresponding applications terminal for the respective service able to communicate with the ISDN network, but also organizes and remote controls the essential functions, such as establishing the connection, direct data exchange, ending the connection, etc.

For the very important telefax service, the control device contains in addition a Hayes-compatible Standard AT Command Set for the ISDN control program part, which forms an expanded control program part for the telefax service.

This expanded control program part performs a bi-directional protocol translation. On the applications terminal side, e.g. the PC, translates a proposed TIA/EIA-592 protocol from the Telecommunications Industry Association into a T.30 CCITT protocol for the transmission of an image-coding process according to T.4 CCITT on the ISDN network side. The TIA/EIA-592 protocol corresponds to the Standards Proposal No. 2388-B proposed new standard "Asynchronous Facsimile DCE Control Standard" by the TIA, dated Mar. 13, 1992.

The following explains in greater detail the exchange of two telefax pages, one for the telefax sending and one for the telefax receiving operation, by means of corresponding command tables.

TABLE 1

| | | SENDING OPERATION | | |
|---|---|---|---|---|
| DTE Commands | DCE Responses | Local DCE Action | Remote Station Action | Notes |
| AT + FCLASS = 2.0 | OK | Set Class 2 | | |
| [AT + FLI = " < local ID > " ] | OK | Set local ID | ID | DTE may load a local |
| ATD < dial string > | | off hook, dial, send CNG | answer, send [CED ] | |
| | [+ FCO [ + FNF:" < nsf > "] ( + FCI: + FDIS: < dis codes > } OK | detect flags [get NSF] [get CSI] [get CSI] get DIS | Preamble, [NSF,] [CSI,] DIS | |

TABLE 1-continued

| | | SENDING OPERATION | | |
|---|---|---|---|---|
| DTE Commands | DCE Responses | Local DCE Action | Remote Station Action | Notes |
| [AT + FNS = " < hex NSS FIF string > " ] | OK | | | DTE may respond to NSF frame |
| AT + FDT | | [send NSS,] [send TSI,] send DCS send TCF | [get NSS,] [get TSI,] get DCS get TCF | if + FNS loaded if + FLI loaded |
| | { + FCS: < codes >} CONNECT | get CFR send carrier | send CFR get carrier | |
| < 1st page data > < DLE> < " , " > | | send page data send RTC | get data get RTC | |
| AT + FDT | OK | send MPS get MCF send carrier CONNECT | get MPS send MCF receive carrier | |
| < 2nd page data > < DLE > < " . " > | | send 2nd page send RTC | get 2nd page get RTC | |
| | + FHS:00 OK | send EOP get MCF send DCN hangup | get EOP send MCF get DCN hangup | |

Table 1 shows the process of the sending operation. The first column contains the DTE commands to be carried out by the applications terminal, where DTE stands for Data Terminal Equipment.

The responses of the interface can be found in column 2 "DCE responses", and the respective "Local DCE actions" in column 3, where DCE stands for Data Circuit Equipment.

Column 4 shows the necessary actions of the remote station, and column 5 "Notes" contains additional remarks.

As clearly shown in Table 1, the applications terminal first establishes a connection (dial). This is followed by an exchange of parameters, such as e.g. the identity of the called/calling terminal and the transmission speed. After the "ready to transmit" signal is received, the individual telefax pages (FDT=Fax Data Transmission) takes place. The connection is subsequently closed.

TABLE 2

| | | RECEIVING OPERATION | | |
|---|---|---|---|---|
| DTE Commands | DCE responses | Local DCE action | Remote Station Action | Notes |
| | 2 < – | Detect ring < – off hook, send CED, send DIS, detect flags, get DCS | Dials[, send CNG] get CED, get DIS, send Preamble, send DCS, |
| ATA | | | | |
| | + FCO | | | |

TABLE 2-continued

RECEIVING OPERATION

| DTE Commands | DCE responses | Local DCE action | Remote Station Action | Notes |
|---|---|---|---|---|
| | 0 | begin TCF recv | start TCF | |
| AT + FDR | | accept TCF | finish TCF | |
| | | send CFR | get CFR | |
| | 1 | get carrier | send carrier | receive 1 page doc |
| < DC2 > | < 1st page data > | get page data | send page data | |
| | < DLE > < ETX > + FPS:, < 1c > 0, 0,0 + FET:1 0 | get RTC get EOM | send RTC send EOM | |
| AT + FDR | | send MCF send DIS get DCS & TCF send CFR | get MCF get DIS send DCS & TCF get CFR | restart Phase B |
| | 1 | get page carrier | send page carrier | |
| < DC2 > | < page data stream > | get page data | send page data | |
| | < DLE > < ETX > f+ FPS:1, < 1c >, 0,0,0 + FET:2 0 | get RTC get EOP | send RTC send EOP | |
| AT + FDR | + FHS:00 < − 0 | send MCF get DCN < − hangup | get MCF, send DCN hangup | get DIS |

Table 2 shows the receiving process. Columns 1 to 5 correspond to columns 1 to 5 of table 1. During the receiving process, the connection is made by the remote station (column 4=dial). Then the parameter exchange as well as the actual transmission of two telefax pages takes place by FDR=Fax Data Receive. The precise command process can be found in table 2.

At the present time, the telefax service performs a one-dimensional Huffmann encoding for a Fax-G3 transmission on the applications terminal side.

According to a further development of the invention, it is also possible to transmit data directly in the form of binary files, instead of the Huffmann encoding. An error correction mode in accordance with T.30 CCITT can be used to that effect.

According to a further development of the invention for telefax Gr. 3 service, data can be transmitted in transparent, i.e. unmodulated form through a B-channel with 64 kbits/s, instead of the usual data modulation/demodulation.

Another advantage of the subscriber terminal according to the invention is that, based on the displays which are on line anyway, the characteristic parameters of the respective applications terminal can be shown at any time in the form of a status report. The transmission speed of the above described telefax service, in particular, can be displayed for example.

It is also possible to equip the ISDN telephone 11 with more than one connection socket 19, for example for teletex and telefax communications via two separate computers (PC or other work stations).

The ISDN telephone 11 is equipped with a not shown switch, with which the different interfaces, and thereby the different possibilities, can be connected, depending on the respective integration or expansion of the telephone 11.

As can be seen from the preceding, none of the utilized applications terminals is a dedicated communications terminal, rather a "normal" instrument that is tailored for its own intrinsic operation, such as a computer (e.g. PC, usual work stations), a keyboard or printer. The communication services offered by the ISDN network can be used exclusively by the respective applications terminals, because the text and/or graphics-oriented communication is integrated into the ISDN telephone.

What is claimed is:

1. A subscriber terminal for an ISDN network in the form of an ISDN telephone, comprising:

at least one telephone keyboard;

a display;

a connection socket for connecting at least one application terminal; and an integrated interface means for establishing communication between said at least one application terminal and the ISDN network through the connection socket, having a non-voice server and a service-independent means for providing direct communication of non-voice information signals between the ISDN network and said at least one application terminal, and having a control device for remotely controlling functions of the ISDN telephone and for transmitting directly information to the ISDN network.

2. A subscriber terminal according to claim 1, wherein the ISDN telephone is equipped with an intermediate memory having a sending and a receiving area, which are organized by the non-voice server.

3. A subscriber terminal according to claim 1, wherein the telephone keyboard and the display of the ISDN telephone are used as a sender terminal.

4. A subscriber terminal according to claim 1, wherein the service-independent means operates in accordance with an APPLI/COM-interface specification.

5. A subscriber terminal according to claim 1, wherein data can be transmitted directly to the ISDN network by means of the control device.

6. A subscriber terminal according to claim 5, wherein the control device has a control program that is compatible with Hayes Standard AT Command for ISDN, for telefax service, and an expanded control program for telefax service.

7. A subscriber terminal according to claim 6, wherein expanded control program for telefax group 3 performs a bidirectional translation of a TIA/EIA-592 protocol of the Telecommunications Industry Association on the application terminal side, into a T.30 CCITT protocol with image coding of the data to be transmitted according to T.4 CCITT on a side corresponding to the ISDN network.

8. A subscriber terminal according to claim 7, wherein instead of image coding the data to be transmitted, the data is transmitted in the form of a binary file, and an error correction mode according to T.30 CCITT is used.

9. A subscriber terminal according to claim 7, wherein, for telefax group 3, the data are transmitted in digitally transparent form over a B-channel with 64 kbits/s.

10. A subscriber terminal according to claim 1, wherein the ISDN telephone is switchable between the non-voice server, the service-independent interface area or the control device.

11. A subscriber terminal according to claim 1, wherein the interface is installed in the ISDN telephone housing.

12. A subscriber terminal according to claim 1, wherein a display provides a status report, depending on the application terminal.

13. A subscriber terminal according to claim 1, wherein the interface is installed in the ISDN telephone housing.

14. A subscriber terminal according to claim 1, wherein said non-voice information signals include text-oriented information signals and graphics-oriented information signals.

15. A subscriber terminal according to claim 1, wherein said at least one application terminal includes either a printer, a keyboard, a facsimile machine, or a personal computer.

16. A subscriber terminal for an ISDN network in the form of an ISDN telephone, having at least one telephone keyboard, a display and having a connection socket for connecting at least one application terminal, wherein the ISDN telephone includes an integrated interface for establishing communication between said at least one application terminal and the ISDN network, wherein the integrated interface has a non-voice server for coupling said at least one application terminal to the ISDN telephone to provide direct communication of non-voice information signals, including text-oriented information signals and graphics-oriented information signals, wherein the integrated interface also has a service-independent interface means for coupling the ISDN telephone to the ISDN network for providing telextex and telex services, page-oriented communication services, telefax, and graphics-oriented communications services, and wherein the integrated interface also has a control device for remotely controlling the function of the ISDN telephone and for transmitting directly information to the ISDN network.

17. A subscriber terminal according to claim 16, wherein the ISDN telephone is equipped with an intermediate memory having a sending and a receiving area, which are organized by the non-voice server.

18. A subscriber terminal according to claim 17, wherein the control device has a control program that is compatible with Hayes Standard AT Command for ISDN, for telefax service, and an expanded control program for telefax service.

19. A subscriber terminal according to claim 18, wherein expanded control program for telefax group 3 performs a bidirectional translation of a TIA/EIA-592 protocol of the Telecommunications Industry Association on the application terminal side, into a T.30 CCITT protocol with image coding of the data to be transmitted according to T.4 CCITT on a side corresponding to the ISDN network.

20. A subscriber terminal according to claim 16, wherein the ISDN telephone switches between the non-voice server, the service-independent interface area or the control device.

21. A subscriber terminal according to claim 16, wherein said at least one application terminal includes a printer, a keyboard, a facsimile machine or a text processing system.

22. A subscriber terminal according to claim 16, wherein said text-oriented information signals include teletex information signals and telex information signals, and said graphics-oriented information signals include telefax information signals.

23. An ISDN telephone for connecting to an ISDN network, comprising:

a telephone keyboard for providing text information signals;

a display for displaying text information signals;

a connection socket to be connected to at least one external application terminal; and an integrated interface means having a text-oriented and graphics-oriented information server for providing direct communication of text-oriented and graphics-oriented information signals between the ISDN network and said at least one external application terminal, and for providing direct communication of text-oriented information signals between the ISDN network and the telephone keyboard and the display.

24. An ISDN telephone according to claim 23, wherein said at least one application terminal includes either a printer, a keyboard, a facsimile machine or a text processing system.

25. An ISDN telephone according to claim 23, wherein said text-oriented information signals include teletex information signals and telex information signals, and said graphics-oriented information signals include telefax information signals.

* * * * *